United States Patent [19]
Wallace et al.

[11] 3,778,209
[45] Dec. 11, 1973

[54] EXTRUDER FOR FOOD PRODUCTS SUCH AS TAMALES

[75] Inventors: Paul K. Wallace; Banjamin K. Wallace, both of Salt Lake City, Utah

[73] Assignee: Dan Morrison Meat Pies, Inc., Salt Lake City, Utah

[22] Filed: Dec. 16, 1971

[21] Appl. No.: 208,869

[52] U.S. Cl.............. 425/133, 425/164, 425/132, 425/168, 425/166
[51] Int. Cl......... A21c 11/14, B29f 3/01, B29f 3/12
[58] Field of Search................ 425/131, 132, 133, 425/166, 168, 308, 315, 316, 377, 164, DIG. 55

[56] References Cited
UNITED STATES PATENTS

| | | | |
|---|---|---|---|
| 3,550,203 | 12/1970 | Lemelson | 425/132 X |
| 2,837,041 | 6/1958 | Endeveld | 425/133 |
| 1,711,750 | 5/1929 | Schoppner | 425/133 X |
| 3,279,936 | 10/1966 | Forestek | 425/DIG. 55 |
| 2,532,131 | 11/1950 | Van Voorst | 425/133 X |
| 1,899,974 | 3/1933 | Mooney | 425/168 X |

FOREIGN PATENTS OR APPLICATIONS

| | | | |
|---|---|---|---|
| 634,762 | 7/1963 | Belgium | 425/133 |

*Primary Examiner*—J. Spencer Overholser
*Assistant Examiner*—David S. Safran
*Attorney*—B. Deon Criddle

[57] ABSTRACT

A food product suitable for deep frying in either a fresh or a frozen state, wherein an inner meat food is totally enrobed by an outer moldable food, such as potato, and a machine capable of continuously extruding the food product.

7 Claims, 9 Drawing Figures

3,778,209

PATENTED DEC 11 1973

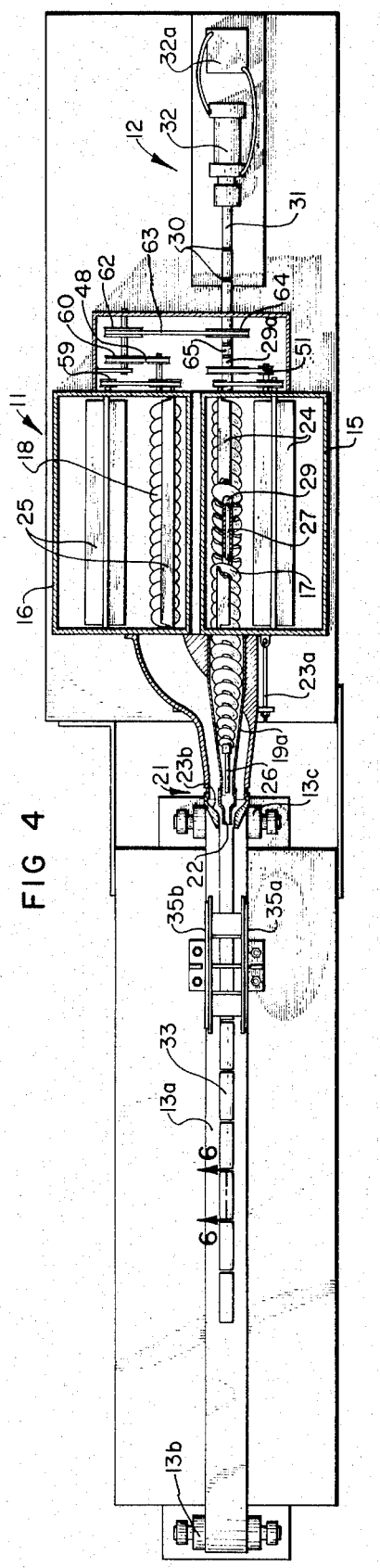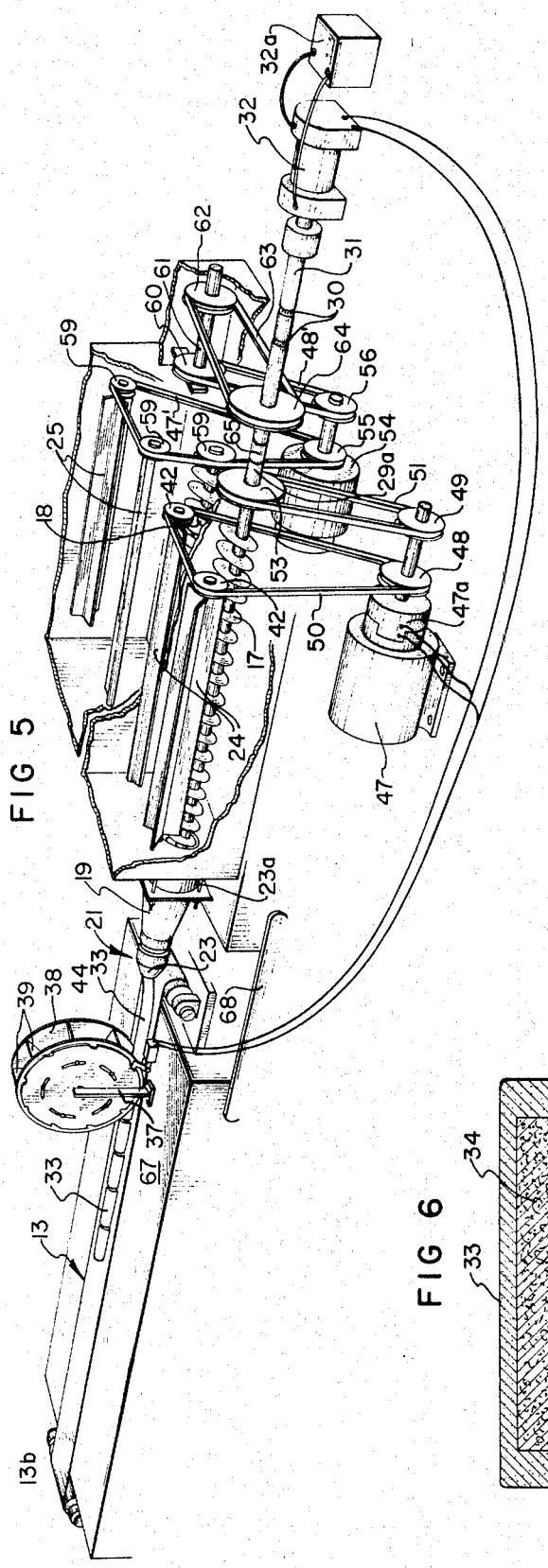
FIG 4
FIG 5
FIG 6

EXTRUDER FOR FOOD PRODUCTS SUCH AS TAMALES

BRIEF DESCRIPTION OF THE INVENTION

1. Field of the Invention

This invention relates to food products wherein a meat filler is covered by a moldable outer food and to machines for producing and extruding such products.

2. Prior Art

Food products having a central filling and an outer moldable food covering have long been known. Tamales, for example, are typical of such foods and machines for producing such foods have long been available. In producing the known foods a meat filler is extruded through an inner nozzle and a moldable outer food material such as corn meal is simultaneously extruded through a surrounding nozzle. The resultant continuous ribbon of product is then cut into bars of desired length and, the individual cut bars are wrapped for merchanidizing and to keep the meat and juices therein from escaping at the cut ends, especially as they are cooked. To our knowledge there has not heretofore been available a food product having a meat filler that is entirely surrounded by an extruded moldable outer material and particularly there has not been such a product wherein the moldable outer material comprises potato that has been dehydrated and then reconstituted to a moldable form.

SUMMARY OF THE INVENTION

Principal objects of the present invention are to provide a machine capable of continuously producing food products having an extruded filler material of meat or the like and an extruded outer covering of a moldable food product, such as reconstituted potato, that completely envelopes the filler material.

Other objects are to provide a food product wherein a moldable food material completely envelopes an extruded filler material such that the combined product can be handled and cooked without loss of the meat material or the juices contained within the outer moldable food material and without the necessity for individual wrapping of the food product articles.

Principal features of the invention include a double nozzle extruder machine with a central nozzle through which meat, or other suitable filler material, is extruded and a surrounding nozzle through which a moldable material such as reconstituted potato, i.e. dehydrated potato to which sufficient water has been added to make a moldable potato material, is extruded in surrounding relationship to the extruded filler material. Means are provided for intermittently stopping flow of the filler product in such a manner that uniform, intermittent extrusion is maintained and for slicing the continuously extruded outer material between portions of the intermittently extruded filler material such that the resulting product is a food article having a meat or other suitable filler, totally enveloped within a moldable food outer material and with the articles being of uniform construction.

The article produced can be frozen and stored for future use, or can be immediately cooked, as by deep frying. Since the filler material is completely enclosed the material itself and the juices contained therein are retained and cannot escape even during the cooking process.

Additional objects and features of the invention will become apparent from the following detailed description and drawings, disclosing what is presently contemplated as being the best mode of the invention.

THE DRAWINGS

In the drawings:

FIG. 1 is a side elevation view of the machine of the invention;

FIG. 2, a top plan view;

FIG. 2a, an enlarged sectional view taken on the line 2a—2a of FIG. 2, and showing the food material feed and extrusion nozzle arrangement of the invention;

FIG. 2b, an enlarged sectional view, taken on the line 2b—2b of FIG. 2, and showing the extrusion nozzle and the envelope material flow interrupting means;

FIG. 2c, an enlarged sectional view taken on the line 2c—2c of FIG. 2, showing the square shaft of the flow interrupting means sliding axially within a driver pulley;

FIG. 3, an enlarged vertical section taken on the line 3—3 of FIG. 2, and with the cutting wheel partially broken away for clarity;

FIG. 4, a horizontal section, taken on the line 4—4 of FIG. 1;

FIG. 5, a schematic view showing the drive arrangement of the machine; and

FIG. 6, an enlarged vertical section, taken on the line 6—6 of FIG. 4, and showing the food product of the invention in cross section.

DETAILED DESCRIPTION

Figure 1:
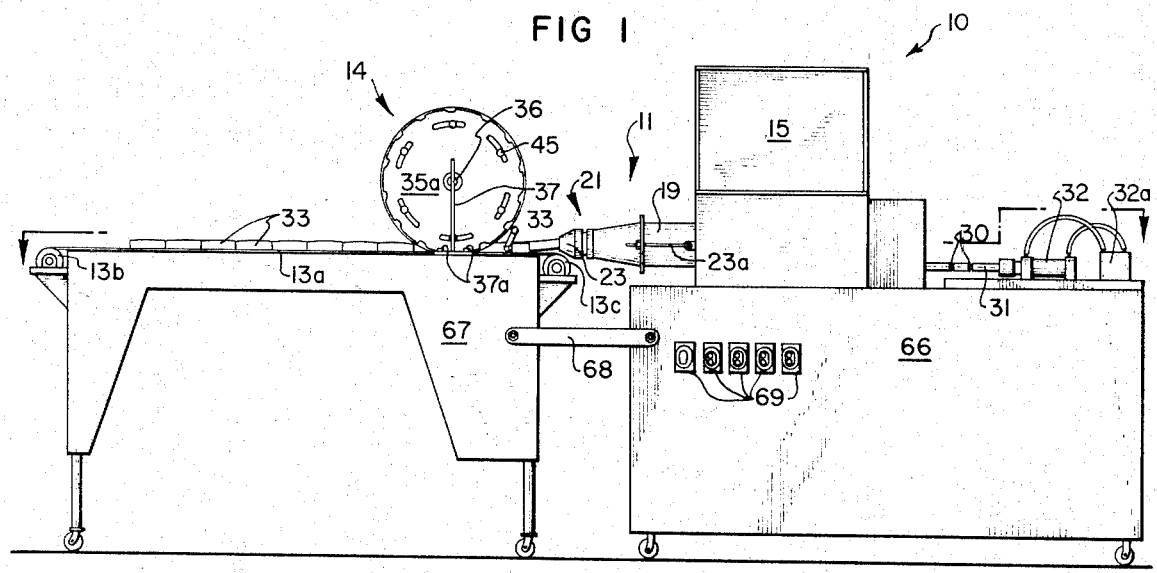

In the illustrated preferred embodiment, the machine of the invention, shown generally at 10, includes an extruder unit 11, a plunger unit 12, a conveyor 13 and a cutter unit 14.

The extruder unit comprises a pair of feed hoppers 15 and 16, with screw-type augers 17 and 18, respectively, journaled in the bottoms thereof. Outlet housings 19 and 20, respectively, lead from the lower ends of hoppers 15 and 16 to a common nozzle assembly 21, best shown in FIG. 2a, and the augers are rotated, as will be hereinafter described, to force food materials placed in the hoppers through the outlet housings at constant pressures.

The common nozzle assembly 21, includes an inner nozzle 22 threaded onto outlet housing 19a and through which material from hopper 15 is extruded and a nozzle 23, secured to outlet housing 19 by bolt and nut assemblies 23a, through which material from hopper 16 is extruded.

Stirrer paddles 24 and 25 are also respectively journaled in the hoppers 15 and 16 to rotate in and to continuously mix the food products placed in the hoppers. In practice, for example, a ground meat product is placed in hopper 15 and potato that has been dehydrated and then reconstituted with water to a suitable moldable consistency is placed in hopper 16.

Means are provided for intermittently stopping the flow from hopper 15 through nozzle 22. As shown, the means comprise a plunger 26, FIG. 2b, on one end of a shaft 27, positioned within the open end of nozzle 22. Shaft 27 extends through but turns independently of axle 29 of auger 17 and is arranged as will be described, to rotate continuously while axle 29 and auger 17 rotate intermittently. The end of shaft 27, extending from the end 29a of axle 29 is formed with a square body that is slidably fitted through an appropiate square axle opening in a driver pulley 64 and is connected to a swivel type universal coupling 30 on a plunger 31 of a pneumatic cylinder 32. The swivel type coupling allows rotation of shaft 27 without rotation of plunger 31 when pulley 64 rotates and allows for some degree of misalignment of the shaft 27 and plunger 31, but insures reciprocation of the shaft 27 through axle 29 contiguously with reciprocation of plunger 31. Thus, when plunger 31 is expelled, through operation of the pnuematic cylinder, plunger 26 is pushed into nozzle 22 to essentially close the outlet opening 22a thereof. When plunger 31 is retracted, through operation of pneumatic cylinder 32, plunger 26 is withdrawn from the outlet opening 22a, such that it does not impede feed of filler material from hopper 15 through inner outlet housing 19a and the nozzle 22. It has been found that the continuous rotation of plunger 26 on the end of shaft 27 allows the plunger to separate more cleanly from the material within the nozzle as it is withdrawn and thereby insures a more uniform delivery of product through the nozzle. It has also been found that if the plunger is coated with Teflon (polytetraflourethylene) or is made of plastic or nylon, that it separates still more cleanly from the food material, thereby still further insuring uniform delivery of product. Nozzle opening 22a is arranged to be only slightly larger in diameter than is the diameter of plunger 26 to further insure a clean separation of material therefrom. The interior of nozzle 22 extending from the opening 22a, is flared outwardly at 22b, so as to allow full flow of material around plunger 26 when it is in its retracted position. Nozzle 23 has a similar flared section 23b therein.

In operation, a continuous ribbon 33 of moldable potato material, that has columns of meat filler material 34 injected therein, is extruded from nozzle 23 onto the conveyor 13. Conveyor 13 consists of a continuous belt 13a traveling over rollers 13b and 13c, driven by a motor, not shown.

The cutter unit 14 is driven by the movement of belt 13a. The cutter unit 14 consists of an outer drum 35 journaled on a rod 36 that extends as an axle between upright brackets 37 that are mounted by bolts 37a to table 67. An inner drum 38 is connected between the sides of drum 35. The outer circumference of the side walls of inner drum 38 are positioned between the sides of drums 35 and rest on the belt 13a such that as belt 13a moves, drums 35 and 38 are turned around axle rod 36. A traction surface is preferably provided on the outer circumference of the sides of drum 38 to provide a non-slip contact with belt 13a.

Drum 38 is formed by a number of cutting blades 39, which radiate outwardly, in a spoke-like fashion, from a hub 38a through which the rod 36 is axially fitted. Each cutting blade 39 is maintained between the sides of drum 38 such that cutting edge 39a thereof is arranged to project to the outer circumference of drum 35 such that the cutting edge will contact the face of belt 13a, thereby cutting across and through the ribbon of food materials traveling thereon.

Means are provided to intermittently inject a column of meat filler material 34 into outer moldable potato material 33 and for slicing the extruded outer potato material between portions of the intermittently extruded meat filler material such that the resulting product is a food article having a meat or other suitable filler totally enveloped within a moldable food outer material. The means used to synchronize the feed of the materials includes a number of timing notches 40 spaced around the outer circumference of drum side 35a. A roller 41, journaled for rotation on the end of an arm 42, is aligned and biased to move into each notch 40 as drum 35 turns, and is connected to a rod 43 that extends from a solenoid 44. Each timing notch 40 has an abrupt shoulder 40a and a gradually inclined track 40b. As drum 35 turns, roller 41 is urged against drum side 35a by a spring 41a, FIG. 3, and sequentially into each notch 40, thereafter being cammed out of the notch by the inclined track 40b. This movement of the roller 41 is translated through arm 42 to move rod 43 in and out of solenoid 44. Each inward or outward movement of rod 43 with respect to solenoid 44 controls electrically, through an appropriate circuit, shown schematically in FIG. 5, the operation of pneumatic control valves 32a of pneumatic cylinder 32. Proper operation of the cylinder, as has been heretofore described, will cause plunger 26 to intermittently stop the extrusion of the meat filler material 34 within the extruded ribbon of moldable potato material 33. The turning of drum 35 therefor synchronizes both the injection of the meat filler material into the moldable potato material and the cutting, between the columns of injected meat filler, the extruded ribbon of food material.

Figure 3:
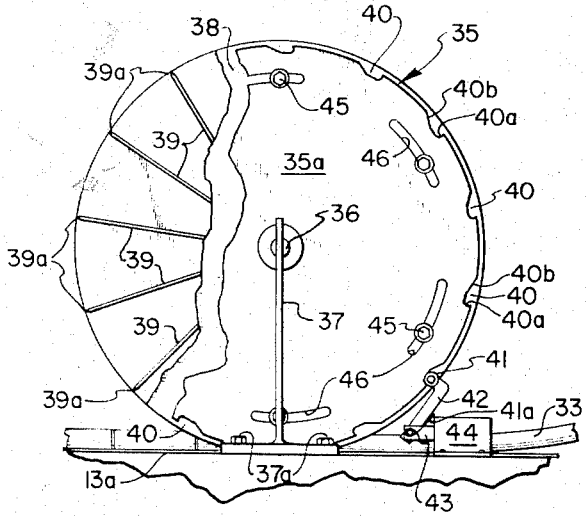

As shown in FIG. 3, adjustment or positioning of the blades 39 with respect to the timing notches is accomplished by rotating inner drum 38 with respect to outer drum 35 around axle 36. Locking bolts 45 extend outward from drum 38, through elongated grooves 46 in the outer walls 35a and 35b of drum 35, and when a proper alignment relationship is attained, are turned against the edges of grooves 46 to lock the inner and outer drums together. When properly aligned, with cutter unit 14 operating, the extruded ribbon of food material will be sliced between the encased columns of meat filler material 34 such that an envelope of moldable potato material 33 fully enrobes the meat filler core.

FIG. 5 shows schematically the power transfer and mechanical drive structure of the invention. As illustrated, an output shaft of a motor 47 is connected through a clutch 47a to rotate driver pulleys 48 and 49. The pulleys 48 and 49 are respectively connected by belts 50 and 51, to pulleys 42, that rotates paddles 24, and a pulley 53 that turns auger 17. The clutch 47a is electrically connected to the solenoid 44 such that when plunger 26 is inserted into the nozzle 22, clutch 47a is disengaged, thereby stopping rotation of the auger 17 and paddles 24. Since the auger is stopped, meat filler material 34 does not accumulate behind the inserted plunger 26. The output shaft of another motor 54 has driver pulleys 55 and 56 thereon and that respectively turn pulleys 59, that rotate paddles 25 and auger 18, and a pulley 60, that is connected by a shaft 61 to another driver pulley 62 through belts 47' and 48'. Pulley 62 acts to rotate pulley 64, through belts 63 fixed to the square end of plunger shaft 27, thereby turning the shaft. Shaft 27 has a round cross section for the greater portion of its length but is formed with a square cross section portion 27a at one end. The end 29a of axle 29 is journaled by a bearing 65 in the machine housing to turn independently of pulley 64. Thus, shaft 27 can be continuously rotated by pulley 64 while auger 17 can be stopped.

Figure 2:
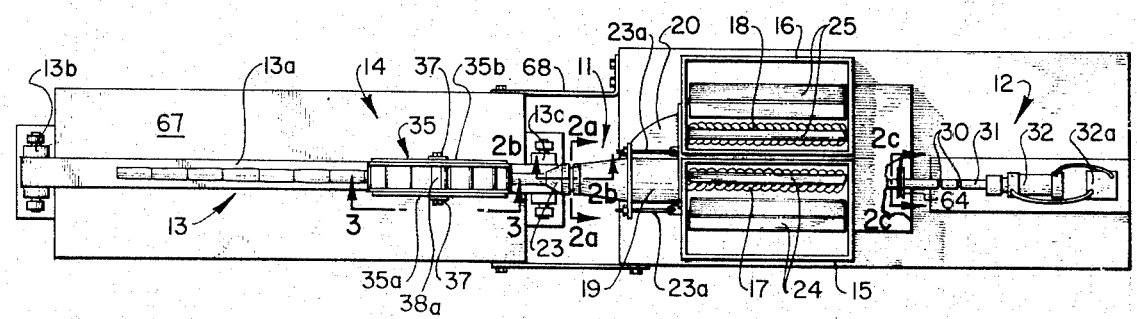
Figure 2A:
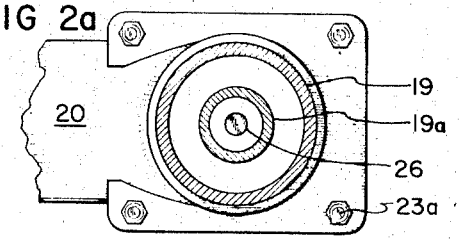
Figure 2B:
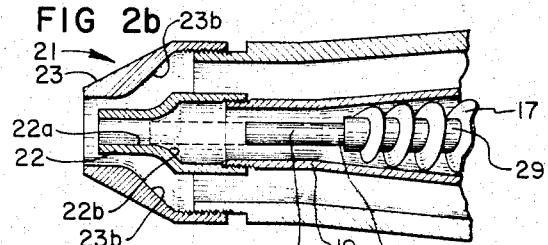
Figure 2C:
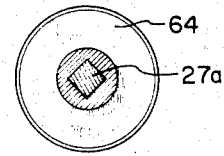

As shown in FIGS. 1 and 2, the machine 10 is mounted to two tables 66 and 67 which are rigidly connected together in aligned relationship by straps 68. Table 66 has a number of push button controls 69 on one side thereof for operating the motors and clutching mechanisms, heretofore described, which are all housed within side walls of the tables.

Although a preferred form of our invention has been herein disclosed, it is to be understood that the present disclosure is made by way of example and that variations are possible without departing from the subject matter coming within the scope of the following claims which subject matter we regard as our invention.

We claim:

1. A machine for producing a food product comprising
    a double nozzle extruder machine having a central nozzle arranged within a surrounding nozzle;
    a first hopper arranged to supply a food material to the central nozzle;
    a second hopper arranged to supply a moldable food material to the surrounding nozzle;
    means for continuously transfering moldable material from said hoppers for extrusion through said nozzles;
    means for intermittently stopping extrusion of material through said central nozzle, said means including a plunger arranged to serve as a stopper in the central nozzle, and means for intermittently coaxially inserting said plunger into and for withdrawing said plunger from said central nozzle;
    means for conveying material extruded from said nozzles;
    means for intermittently transversely cutting through the material extruded from said surrounding nozzle; and
    means for synchronizing the extrusion of moldable material through said central nozzle and the cutting of said extruded ribbon of moldable material such that the moldable material extruded through said surrounding nozzle is cut between intermittent extrusions from said central nozzle whereby said intermittent extrusions are entirely surrounded by material extruded from the surrounding nozzle.

2. A machine as in claim 1, wherein the means for intermittently inserting said plunger into and for withdrawing said plunger from said central nozzle includes
    a shaft connected to said plunger, arranged to slide said plunger into said central nozzle; and
    a pneumatic cylinder having a rod therein that is coupled to said shaft and is arranged to reciprocate said shaft in response to air pressure supplied thereto and exhausted therefrom.

3. A machine as in claim 1, further including means for continuously rotating said plunger.

4. A machine as in claim 1, wherein the outer surface of the plunger is made of polytetraflourethylene.

5. A machine as in claim 1, wherein the means for conveying material extruded from the nozzles comprises an endless conveyor belt and the means for cutting the moldable material extruded through the surrounding nozzle includes
    cutting wheel having circular sides with their peripherys resting on the conveyor belt such that the cutting wheel is revolved by movement of said conveyor belt; and
    a plurality of cutting blades radiating from the center of the cutting wheel, between the sides thereof and extending outwardly to the outer circumference of said wheel such that as said conveyor belt moves the extruded material between the sides of the cutting wheel the blades cut through the said material.

6. A machine as in claim 5, wherein the means for synchronizing the extrusion of moldable material through said central nozzle and the cutting of said extruded ribbon of moldable material includes
    spaced notches formed at the outer circumference of one side of said cutting wheel;
    a follower;
    means biasing the follower against the periphery of the said one side;
    means generating an electrical signal as the follower moves into each notch and means responsive to said electrical signal to operate the means for intermittently stopping extrusion of material through the central nozzle.

7. A machine as in claim 6, wherein the means for continuously transfering moldable material from said hoppers comprises
    an auger in each hopper and motor means to drive each auger; and
    the means for intermittently stopping extrusion of the material through the central nozzle includes clutch means interconnecting the motor means arranged to drive said auger and means responsive to the electrical signal to operate said clutch to drivingly disengage the motor means and the auger in the first hopper.

* * * * *